US007162330B2

(12) United States Patent
Mayer

(10) Patent No.: US 7,162,330 B2
(45) Date of Patent: Jan. 9, 2007

(54) METHOD FOR TRANSPORTING POSTAL DELIVERIES AND A DEVICE FOR STORING POSTAL DELIVERIES

(75) Inventor: Boris Mayer, Bonn (DE)

(73) Assignee: Deutsche Post AG (DE)

( * ) Notice: Subject to any disclaimer, the term of this patent is extended or adjusted under 35 U.S.C. 154(b) by 202 days.

(21) Appl. No.: 10/820,688

(22) Filed: Apr. 8, 2004

(65) Prior Publication Data

US 2004/0236464 A1 Nov. 25, 2004

Related U.S. Application Data

(63) Continuation of application No. PCT/DE02/03757, filed on Oct. 7, 2002.

(30) Foreign Application Priority Data

Oct. 9, 2001 (DE) ............................... 101 49 618

(51) Int. Cl.
*G06F 7/00* (2006.01)

(52) U.S. Cl. ...................... 700/228; 700/213; 700/226; 700/242

(58) Field of Classification Search ................ 700/213, 700/223, 224, 242, 244, 226, 228
See application file for complete search history.

(56) References Cited

U.S. PATENT DOCUMENTS

| | | | | |
|---|---|---|---|---|
| 4,636,634 | A * | 1/1987 | Harper et al. | 250/223 R |
| 4,877,121 | A * | 10/1989 | Yamashita et al. | 198/475.1 |
| 4,894,717 | A * | 1/1990 | Komei | 348/150 |
| 4,975,012 | A * | 12/1990 | Motoda | 414/279 |
| 6,010,064 | A * | 1/2000 | Umeda et al. | 235/375 |
| 6,323,782 | B1 * | 11/2001 | Stephens et al. | 340/10.31 |
| 6,456,900 | B1 * | 9/2002 | Kakuta | 700/233 |
| 6,690,997 | B1 * | 2/2004 | Rivalto | 700/237 |
| 6,694,217 | B1 * | 2/2004 | Bloom | 700/215 |
| 6,728,597 | B1 * | 4/2004 | Didriksen et al. | 700/243 |
| 6,737,974 | B1 * | 5/2004 | Dickinson | 340/572.8 |
| 7,055,741 | B1 * | 6/2006 | Bong et al. | 235/382.5 |
| 2001/0042024 | A1 * | 11/2001 | Rogers | 705/26 |
| 2005/0154602 | A1 * | 7/2005 | Hertz | 705/1 |

FOREIGN PATENT DOCUMENTS

| | | | |
|---|---|---|---|
| CH | 691 342 | A5 | 7/2001 |
| DE | 2 563 987 | | 11/1985 |
| DE | 40 09 579 | A1 | 9/1991 |
| DE | 42 33 147 | A1 | 4/1994 |
| DE | 44 35 155 | | 4/1996 |
| DE | 44 35 155 | A1 | 4/1996 |

(Continued)

OTHER PUBLICATIONS

International Preliminary Examination Report in PCT/DE02/03757 dated Dec. 10, 2003.

*Primary Examiner*—Khoi H. Tran
(74) *Attorney, Agent, or Firm*—Marshall, Gerstein & Borun LLP

(57) ABSTRACT

Disclosed herein are a method and device for transporting and sorting postal deliveries. The method includes verifying whether postal deliveries are to be delivered to an electronic parcel compartment system. Furthermore, the method includes determining whether several of the postal deliveries are to be delivered to the same electronic parcel compartment system. Still further, the method includes common transportation and subsequent distribution to individual parcel compartments of postal deliveries to the same electronic parcel compartment system, for at least a part of the transport route.

9 Claims, 2 Drawing Sheets

FOREIGN PATENT DOCUMENTS

| | | | |
|---|---|---|---|
| DE | 196 41 005 | A1 | 12/1998 |
| DE | 199 11 116 | C1 | 5/2000 |
| DE | 200 01 122 | U1 | 9/2000 |
| DE | 199 39 211 | A1 | 3/2001 |
| FR | 2 563 987 | | 11/1985 |
| FR | 2 630 412 | | 10/1989 |
| GB | 1531028 | | 11/1978 |
| GB | 2358432 | | 7/2001 |
| WO | WO 01/00069 | A2 | 1/2001 |
| WO | WO 01/00069 | A3 | 1/2001 |
| WO | WO 01/10574 | A1 | 2/2001 |

* cited by examiner

METHOD FOR TRANSPORTING POSTAL DELIVERIES AND A DEVICE FOR STORING POSTAL DELIVERIES

CROSS-REFERENCE TO RELATED APPLICATION

This is a continuation of International Application No. PCT/DE02/03757 filed Oct. 7, 2002, the entire disclosure of which is incorporated herein by reference.

BACKGROUND OF THE DISCLOSURE

1. Field of the Disclosure

The disclosure generally relates to a method for transporting postal parcels and to a device for storing postal parcels.

2. Brief Description of Related Technology

It is known that a great deal of transportation and storage capacity for postal parcels has to be made available because of failed attempts to deliver postal parcels to absent recipients. In order to solve this problem, FR 2 563 987 A1 has proposed equipping houses of recipients with an electronic parcel compartment. The known parcel compartments receive manual deliveries by a postal deliverer.

Undesirably, however, the work involved in the delivery is increased in that the deliverer has to enter an authorization code at an access terminal before opening a compartment.

SUMMARY OF THE DISCLOSURE

Disclosed herein is a method for transporting postal parcels in such a way that the postal parcels can be delivered as quickly and smoothly as possible, while avoiding failed attempts to deliver postal parcels. Also disclosed herein is a device for storing postal parcels for use in the disclosed method.

Accordingly, the method is carried out in such a way that a checking procedure verifies whether the postal parcels are to be delivered to an electronic parcel compartment system, a determination is made as to whether several of the postal parcels are to be delivered to the same parcel compartment system, and the postal parcels that are to be delivered to the same parcel compartment system are transported together for at least part of their transport route and are subsequently distributed to individual parcel compartments.

Additional features of the disclosed method and device may become apparent to those skilled in the art from a review of the following detailed description, taken in conjunction with the appended claims.

DETAILED DESCRIPTION

Figure 1:
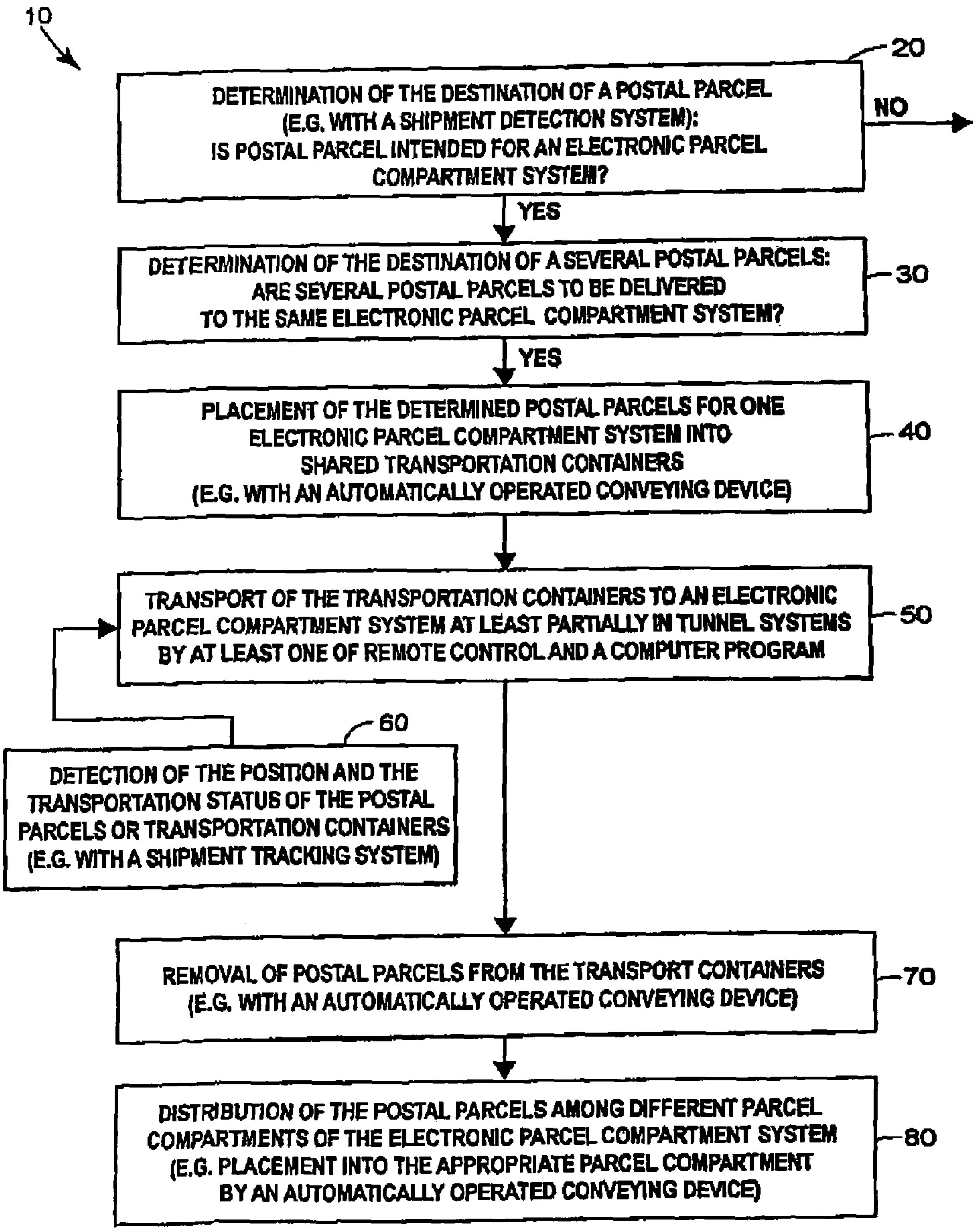
FIG. 1 is a flow diagram of one example of a method for transporting postal deliveries in accordance with the teachings of the disclosure.

Disclosed herein are combinations of various measures to carry out the delivery of postal parcels with the lowest possible energy expenditure and processing effort. As shown in FIG. 1. one method for transporting postal deliveries 10 may include determining the destination of a postal parcel at 20; determining the destination of several postal parcels at

30; placing the postal parcels for one electronic parcel compartment system into shared containers at 40; transporting the containers to the electronic parcel compartment system at 50; detecting a position and status of the postal parcels at 60; removing the postal parcels from the transport containers at 70; and distributing the postal parcels to different parcel compartments at 80. To avoid unnecessary transportation runs, especially in order to avoid empty trips and/or failed delivery attempts, it is especially advantageous to check whether the postal parcels are intended for delivery to an electronic parcel compartment system. This checking can be performed in a variety of ways, for example, by detecting a notice on the postal parcels and/or by comparing shipment and/or recipient identification data with database information.

The envisaged shared transportation of postal parcels can be carried out in various different ways and can be integrated without a great deal of effort into existing shipping logistic systems or can be a component. For example, in a center for outgoing freight or letters, postal parcels can be sorted in such a way that the postal parcels that are to be transported to an electronic parcel compartment system are sorted in such a way that they end up in a shared transportation container. Subsequently, the transportation containers are each transported to the selected electronic parcel compartment system.

In a first configuration stage of the shipping logistic system according to the disclosure, such a transportation can be effectuated in a conventional manner, for example, by conveying the transportation container on conventional vehicles. Such an implementation has the advantage that, to a great extent, existing equipment and infrastructures can still be used and combined with the advantages of an efficient utilization of transport and storage capacity.

In order to make it possible to transport postal parcels even more quickly and smoothly, an especially efficient embodiment of the disclosure provides that the conveyance of the postal parcels, or of the transportation containers holding them, is controlled remotely and/or by a computer program, at least over certain segments. Furthermore, it is advantageous for the shared transport of the postal parcels to take place underground, at least over certain segments.

The disclosed method is especially well-suited to allow the integration of additional logistic functions. In particular, it is advantageous to carry out the method or to configure the logistic system in such a way that the postal parcels are ascertained by means of a shipment detection system. An especially advantageous embodiment is characterized in that the position of the postal parcels is detected at several places in the transport system and/or at several points in time so that the position and/or the transportation status of the postal parcels can be ascertained by means of a shipment tracking system. Advantageously, the method is carried out in such a way that the position and/or the movement of the postal parcels is detected at least once by detecting the position and/or the movement of the transportation container carrying them.

Figure 2:
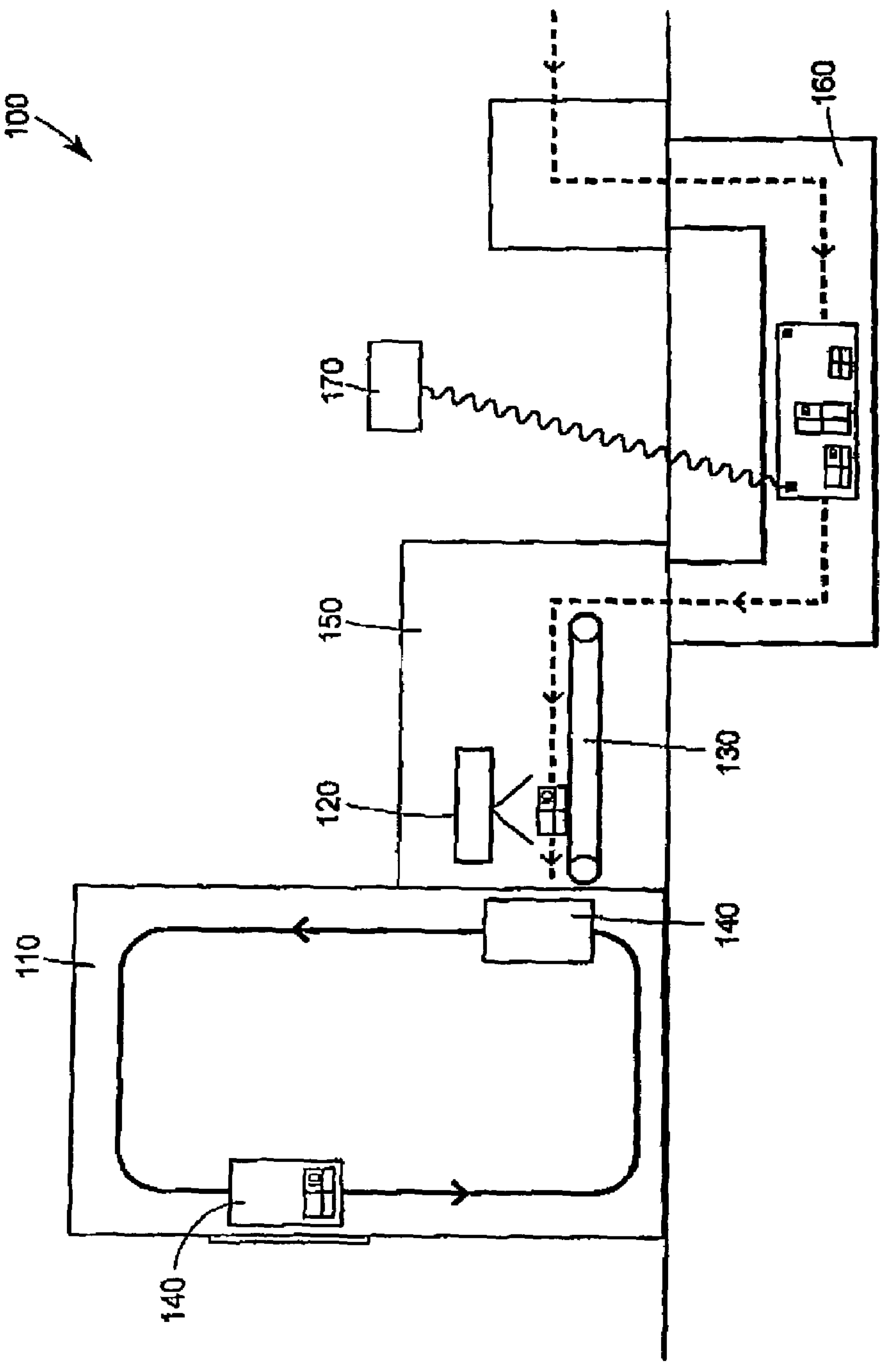
FIG. 2 is a schematic diagram of one example of a device tat employs the method of FIG. 1.

Also disclosed herein is a device for storing the postal parcels as seen in FIG. 2. The device 100 is configured in such a way that it has an electronic parcel compartment system 110 and a means 120 to recognize an identification code on the postal parcels. Such a device 100 is suitable fur numerous application purposes. However, it is especially advantageous to use this device in one of the methods described herein, or as a component of the shipping logistic system disclosed herein.

In an especially preferred embodiment of the device 100 the electronic parcel compartment system 110 can be connected to a conveyor 130 capable of conveying the postal parcels. In this manner, automated loading of the electronic parcel compartment system is possible, so as to reduce the effort required for the filling.

To further increase the efficiency of the device 100, it is also advantageous to connect the conveyor 130 to the electronic parcel compartment system 110 in such a way that the means 120 for detecting the postal parcels is arranged so as to ascertain the postal parcels fed to the electronic parcel compartment system 110 by the conveyor 130

The electronic parcel compartment system 110 can be adapted to the requirements of a specific logistic system and of the users who will be utilizing it. In such a preferred embodiment of the electronic parcel compartment system 110, the conveyor 130 is mounted movably in such a way that it can convey the postal parcels to different electronic parcel compartments 140. Another likewise advantageous embodiment of the electronic parcel compartment system 100 is configured in such a way that the compartments 140 of the parcel compartment system 110 can be moved within the parcel compartment system 110 and that an opening for depositing and/or removing of postal parcels is associated with the conveyor 130.

To integrate additional automated transport systems into the logistic system, to even more quickly and efficiently carry out the method, and/or to further improve the application possibilities of the device 100, it is advantageous for the device 100 to be connected to a stopping place 150 of a transport system for the automatic ad/or remote-controlled conveyance of transportation containers. Advantageously, this embodiment is also configured in that the conveyor 130 is arranged in such a way tat it can convey the postal parcels held in the transportation containers from the stopping place 150 to the electronic parcel compartment system 110.

The following presentation of preferred embodiments shows embodiments in which a method for dispensing and/or receiving parcels, letters and freight shipments in an electronic parcel compartment system 110 is combined with automation of the conveyance and/or loading, or unloading of the parcel compartments 140.

At electronic parcel compartment systems (logistic hubs) 110, bundled parcels, letters, and freight shipments are either given to final recipients or received at central places above-groun. An additional traffic-reducing and cost-cutting effect can be achieved by filling and emptying the logistic hubs underground 160. This means tat parcels, letters, and freight shipments could be fed in and picked up underground 160. by the logistic service provider. This can be done manually and semi-manually by a deliverer on site or else fully automatically by an IT-supported and remotely controlled system, for example, based on the technology of pneumatic tube containers, freight capsules or freight drones.

With the manual or semi-automatic filling and emptying on site, a number of execution variants are especially suitable. One such variant is where the person making the delivery of picking it up brings the parcels, letters and freight shipments to the logistic hub himself and feeds them, for example, through a freight elevator, into the underground system 160 (analogous, for example, to the current delivery system employed in restaurants or department stores). Another such variant is where the parcels, letters, and freight shipments are already on site (delivery or pick-up is done by means of an underground, remote-controlled transportation system) and the logistic hubs are then manually loaded or unloaded.

Depending on their characteristics, the parcels, letters, and freight shipments can also be in boxes, for example. The individual transportation units are provided with a bar code, a transponder, or other data carriers in order to ensure a precise individual muting as well as monitoring of the shipment (tracking and tracing) 170.

The fully automatic execution of the filling step and/or emptying step preferably takes place as described below.

The parcels, letters and freight shipments are delivered by a remote-controlled, underground transportation system directly to the logistic hub. Depending on their characteristics, the parcels, letters, and freight shipments are also in boxes. The individual transportation units are provided with a barcode, a transponder, or other data carriers in order to ensure a precise individual routing (as well as tracking and tracing).

The individual shipment units could then be semi-automatically introduced into or removed from the logistic hubs employing small-storage technology and IT-support.

All of the variants (manual, semi-manual, fully automatic) can be filled or else emptied wit modular systems. Preferably, this is done by means of multi-loading, for example, by loading a complete row of multiple shipments. The transportation in the case of the semi-automatic and the fully automatic variants can be done via conduit or tunnel systems. The modular loading and unloading units are filled or else emptied in a base location (parcel center, delivery bases or warehouses). The loading and unloading units can either themselves be transported, via rail or overhead monorail, to the individual delivery machines or to other logistic hubs or else they are consolidated in larger clusters and integrated into transportable systems so as the reach the individual delivery machines (logistic hubs). Moreover, individual runs, that is to say exclusively loading or unloading of a single delivery machine (logistic hub) or else multiple runs—sequential—to several delivery machines (logistic hubs) are possible consecutively (without returning to a base location).

The foregoing description is given for clearness of understanding only, and no unnecessary limitations should be understood therefrom, as modifications within the scope of the disclosure may be apparent to those having ordinary skill in the art.

What is claimed is:

1. A method for conveying postal parcels, the method comprising the steps of:

determining whether a postal parcel is intended for an electronic parcel compartment system;

determining whether several postal parcels are to be delivered to the same parcel compartment system;

placing the determined postal parcels into shared transportation containers that are each intended for the same parcel compartment system;

controllably transporting, at least over certain segments and at least partially in tunnel systems, the shared transportation containers to the electronic parcel compartment system by at least one of remote control and a computer program; and, distributing the postal parcels among different parcel compartments of the electronic parcel compartment system.

2. The method of claim 1, wherein the shared transportation containers comprise at least one of a barcode, a transponder, and other data carrier that ensure a precise individual routing.

3. The method of claim 1, wherein the transporting step (d) further comprises transporting postal parcels underground at least over certain segments.

4. The method of claim 1, further comprising removing postal parcels from the transportation container with an automatically operated conveying device.

5. The method of claim 1, comprising carrying out the placing step (c) with an automatically operated conveying device.

6. The method of claim 5, wherein the automatically operated conveying device first removes the postal parcels from the transportation containers and then automatically places them into the appropriate parcel compartment.

7. The method of claim 1, comprising carrying out the determining steps (a) and (b) with a shipment detection system.

8. The method of claim 7, further comprising detecting, with a shipment tracking system, the positions and transportation status of the postal parcels at at least one of several places in the transport system and several points in time.

9. The method of claim 8, further comprising detecting at least one or more of the position and movement of the transportation container carrying the postal parcels.

* * * * *